United States Patent [19]

Beeley

[11] Patent Number: 5,033,801
[45] Date of Patent: Jul. 23, 1991

[54] CLEAT ASSEMBLY FOR ENDLESS TRACK VEHICLE

[75] Inventor: Michael G. Beeley, Logan, Utah

[73] Assignee: Logan Manufacturing Company, Logan, Utah

[21] Appl. No.: 904,635

[22] Filed: Sep. 8, 1986

[51] Int. Cl.$^5$ ............................................. B62D 55/28
[52] U.S. Cl. ................... 305/54; 305/35 EB
[58] Field of Search ................ 305/35 R, 35 EB, 38, 305/54, 56

[56] References Cited

U.S. PATENT DOCUMENTS

| | | | |
|---|---|---|---|
| 2,823,080 | 2/1958 | Bauer, Jr. | 305/54 |
| 3,165,364 | 1/1965 | Hardman et al. | 305/54 X |
| 3,346,306 | 10/1967 | Siber | 305/40 |
| 3,572,851 | 3/1971 | Schuler | 305/54 X |
| 3,582,154 | 6/1971 | Russ, Sr. | 305/35 EB |
| 3,765,731 | 10/1973 | Kilbane, Jr. | 305/35 EB |
| 3,782,787 | 1/1974 | Rubel et al. | 305/54 X |
| 3,838,894 | 10/1974 | Reedy | 305/35 EB |
| 3,958,839 | 5/1976 | Nodwell | 305/35 R |
| 3,973,808 | 8/1976 | Janssen et al. | 305/54 |
| 4,023,865 | 5/1977 | Morissette | 305/56 |
| 4,059,315 | 11/1977 | Jolliffe et al. | 305/35 EB |
| 4,281,882 | 8/1981 | Van Der Lely | 305/35 EB |
| 4,560,211 | 12/1885 | Van Der Lely | 305/35 EB |

Primary Examiner—Russell D. Stormer
Attorney, Agent, or Firm—A. Ray Osburn

[57] ABSTRACT

A cleat assembly for the endless track of a vehicle which effectively reduces loosening of the cleat upon the flexible belt of the track, comprising a grouser plate incorporating projections distributed thereover and a backing plate on the other side of the belt also having beltward projections, said projections being clamped by mounting bolts to press into the surface of the flexible belt, to provide shearing area to resist the belt load upon the grouser. The mounting holes through the belt are prevented from elongating and the cleat assembly is held firmly in position even after extended use and plastic flow of the material of the belt.

8 Claims, 5 Drawing Sheets

CLEAT ASSEMBLY FOR ENDLESS TRACK VEHICLE

BACKGROUND OF THE INVENTION

1. Field

The field of the invention is endless track assemblies for snow grooming vehicles, and more particularly the cleat assemblies thereof, including structures for fastening the cleats to the flexible plastic belting of such tracks.

2. State of the Art

Snow groomer vehicles use endless tracks having flexible plastic belts made endless by connecting the ends with lacing or the like. The belts are often reinforced by plies of fabric incorporated into the rubber-like belt material. Steel cleats are bolted across the belts at intervals of a few inches. Each belt is engaged by a power-transmitting sprocket wheel, which forces the belt to travel around a set of guiding wheels called bogies. The powered belt imparts horizontal shear force to the cleats, which engage the snow to propel the vehicle. Much development has gone into the design of the elongate cleat members, with the object of providing maximum traction and resistance to side slipping. Typical cleat constructions are disclosed in U.S. Pat. Nos. 3,765,731, 4,560,211, 4,281,882 and 4,059,315. Typically, the ground contacting cleat, also called a grouser, is fastened to the outside of the flexible belting by bolts or rivets installed in matching holes in the cleat, belt, and a metal backing plate on the inside of the belt. The shanks of the bolts bear against a side of the holes in the belt to transfer the shearing force to the cleats, perhaps initially aided by friction between the belt and the cleat and backing plate. The belt material is malleable, and the fabric plies are discontinuous at the holes, so that the holes become permanently elongated by the concentrated stresses, loosening the cleats. The hole elongation occurs even with great clamping force between the cleat and the backing plate. This is because the belting material creeps under prolonged stress to relieve the clamping force and substantially eliminating the initially helpful friction between the belt and the cleats and backing plate. The use of increased numbers of holes and bolts, as indicated for example in U.S. Pat. No. 4,281,882, FIG. 8., helps somewhat. However, the belting is correspondingly weakened, so that this solution is self-limiting and has not prove satisfactory.

BRIEF SUMMARY OF THE INVENTION

With the foregoing in mind, the disadvantages of the prior art are eliminated or substantially alleviated by providing a cleat assembly comprising an elongate, ground engaging grouser plate and a belt backing plate, both having aligned sets of spaced mounting bores, the belt side of at least one but preferably both plates having a multiplicity of projections on the sides toward the belt. Bolt and nut assemblies installed in the mounting holes forcibly press the projections into the belt. The shearing force is distributed among the many projections, lessening the local unit stresses upon the belt and its reinforcing fabric. The reinforcing fabric remains unbroken at the projections, directly accepting the shear loads. In contrast, the shear loads must in state of the art cleat assemblies be first transferred by the bolts bearing upon the locally unreinforced plastic material of the belt at each hole. The stresses upon the mounting holes in the belt are greatly relieved in the present design, in fact probably eliminated after the belt material yields with passage of time. Thus, the holes are prevented from stretching out of shape, and the cleats do not become loose. The projections pressed into the belt provide many times the effective shear resisting area than do the bolt shanks. Although the plastic material of the belt creeps plastically with the prolonged clamping stress, it tends to set about the projections, providing continued close contact, so that the cleat remains tightly secured. According to one embodiment of the invention, the grouser plates may be without projections, which are instead provided upon a separate gripper plate installed between the grouser and the belt.

It is therefore the principal object of the invention to provide a cleat assembly which can be mounted permanently tightly upon the flexible belts of endless track drives of snow grooming vehicles.

BRIEF DESCRIPTION OF THE DRAWINGS

In the drawings, which represent the best mode presently contemplated for carrying out the invention.

DETAILED DESCRIPTION OF ILLUSTRATED EMBODIMENTS

Figure 1:
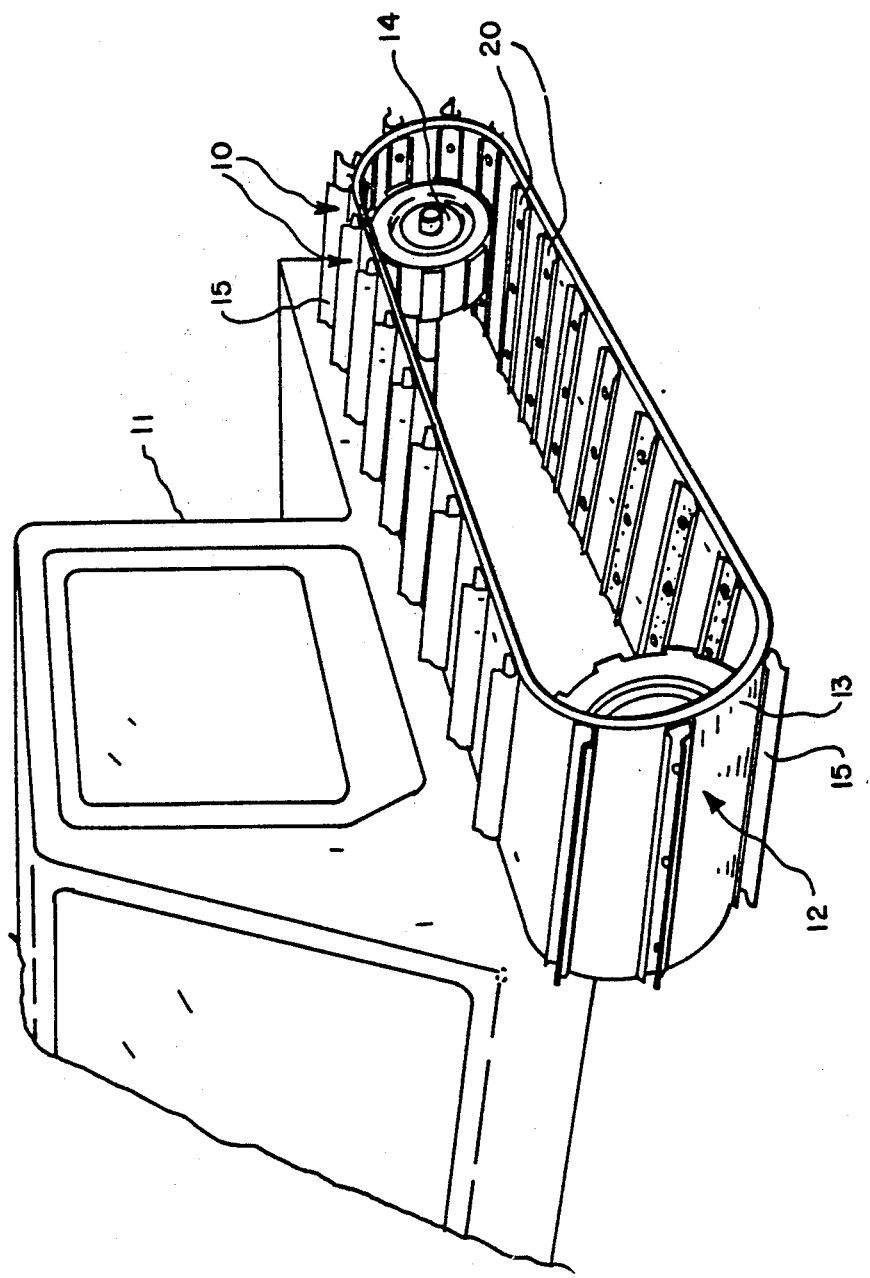
FIG. 1 is an upper right perspective view of an endless track assembly having a flexible belt and attached cleat assemblies in accordance with the invention, the associated vehicle being shown fragmentally, FIG. 2 a vertical cross sectional view of a state of the art cleat assembly with a fragment of an endless flexible belt, FIG. 3 an upper left perspective view of a fragment of the endless belt of FIG. 1 and an attached cleat assembly in accordance with the invention, FIG. 4 an upper left perspective view of a fragment of the flexible belt of FIG. 1, partially cut away to show the reinforcing fabric thereof, FIG. 5 a perspective view of a cut away fragment of a flexible belt after extended use with a state of the art cleat attached thereto, drawn to a somewhat enlarged scale, FIG. 6 a horizontal cross sectional view of a fragment of a flexible belt employed with a conventional cleat assembly, showing the distortion of the fabric from the mounting bolt larger than the hole in the belt, drawn to the scale of FIG. 5, FIG. 7 the fragment of FIG. 6 after extended use, showing the distortion of the mounting hole and the fabric, drawn to the scale of FIG. 5, FIG. 8 a vertical cross sectional view of a cleat assembly in accordance with the invention with dimple shaped projections upon the grouser and backing plates, drawn to substantially full scale, FIG. 9 a perspective view of a fragment of the flexible belt of FIG. 8 showing the undistorted mounting hole and the dimple shaped depressions set into the fabric of the belt, drawn to the scale of FIG. 8, FIG. 10 a vertical sectional view of a cleat assembly in accordance with the invention, having spike shaped projections upon the grouser and backing plates, drawn to substantially full scale, FIG. 11 a vertical cross sectional view of a cleat assembly in accordance with the invention, having punch formed tab projections upon the grouser and backing plates, drawn to substantially full scale, and FIG. 12 a vertical cross sectional view of a cleat assembly in accordance with the invention, having a separate gripper plate with dimpled projections, drawn to substantially full scale.

An endless belt track assembly, with a cleat assembly 10 in accordance with the invention, is shown in FIG. 1 installed upon an off-road vehicle 11, fragmentally indicated. Vehicle 11 may be a snow groomer for use in ski areas, for example. The track assembly 12 comprises a flexible endless belt 13 of soft plastic, made endless by lacing its ends together. The cleat assemblies 10 are secured crosswise to the belt 13 at invervals. Track 12 is supported upon the vehicle by wheels 14, one of which may for power purposes be connected to the engine of vehicle 11. The ground engaging members 15 of cleat assemblies 10, interchangeably called cleats or grousers, are constructed in many configurations, each calculated to provide improved traction with the snow, to prevent side slip of the vehicle, or otherwise perform more desirably and efficiently. However, the present invention is not concerned with traction developing qualities, but with methods for fastening the grousers 15 to the belt 13 in permanently tight condition.

Figure 4:
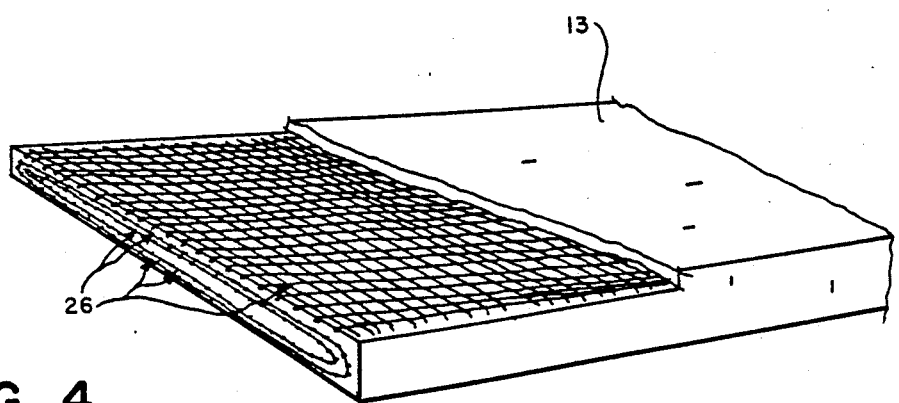

Belt 13 is constructed of rubber-like plastic material, sometimes called synthetic rubber, of which neoprene, butyl rubber and nitrile rubber are examples. For belts used on lightweight vehicles such as snowmobiles, such plastic material is at times utilized without reinforcement. See U.S. Pat. No. 4,059,315 However, the belt material is more commonly reinforced by multiple non-elastic fabric plies incorporated into the belt structure. The fabric plies strengthen the belt and enable it to withstand high tension forces without excessive stretching. A fragment of belting material having four embedded plastic plies 26 is shown in FIG. 4. Typically, the plies have non-elastic polyester threads longitudinal to the belt, but very elastic nonabrasive nylon cross threads.

The material of belt 13 is elastic in the short term, but deforms plastically under prolonged stress. Both characteristics create difficulties in securing the cleat assembly 10 to the belt so that it will not loosen. The elastic give acts against developing the high clamping forces needed to develop significant shear resisting friction on the surface of the belt. The plastic give under prolonged stress exacerbates the situation by tending to relieve the clamping forces, destroying whatever friction has been successfully developed initially.

Figure 2:
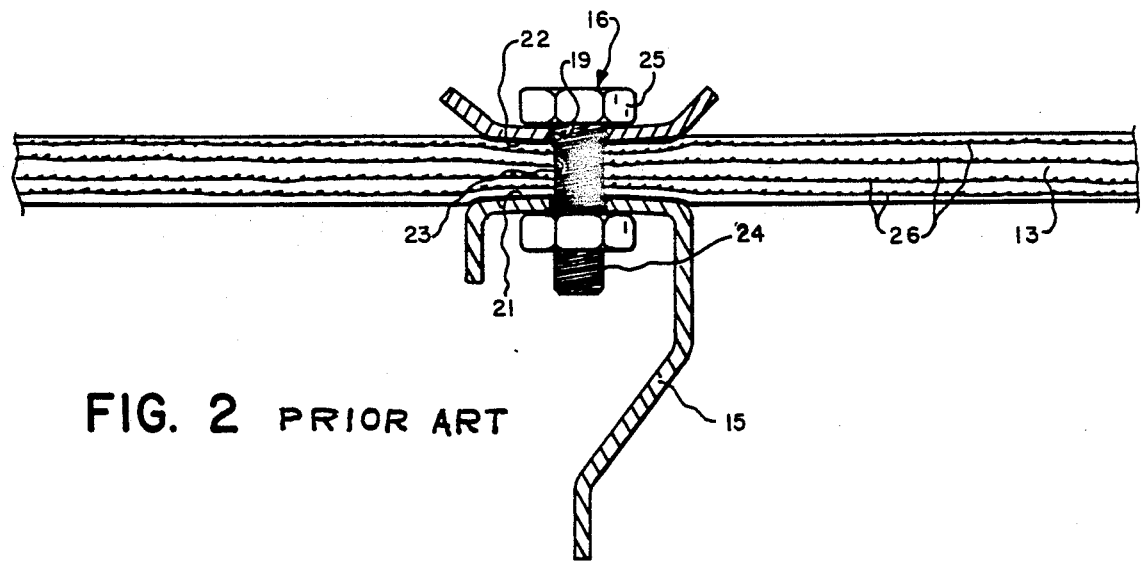
Figure 5:
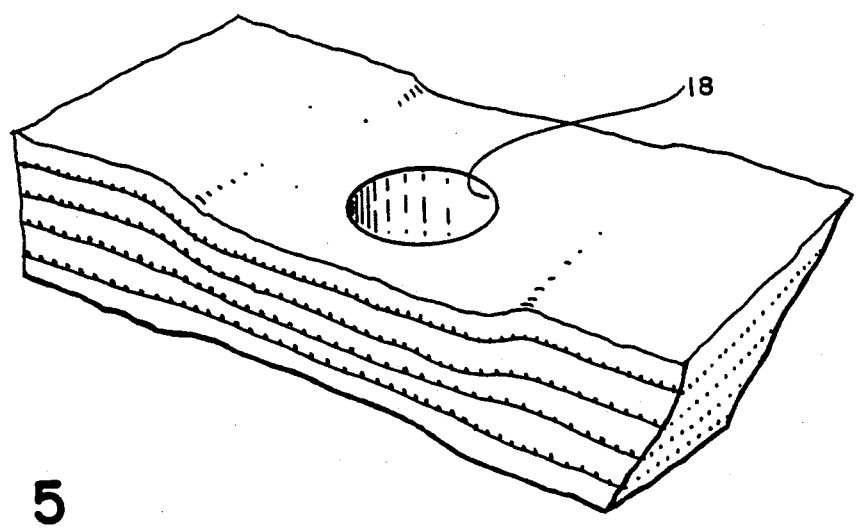
Figure 6:
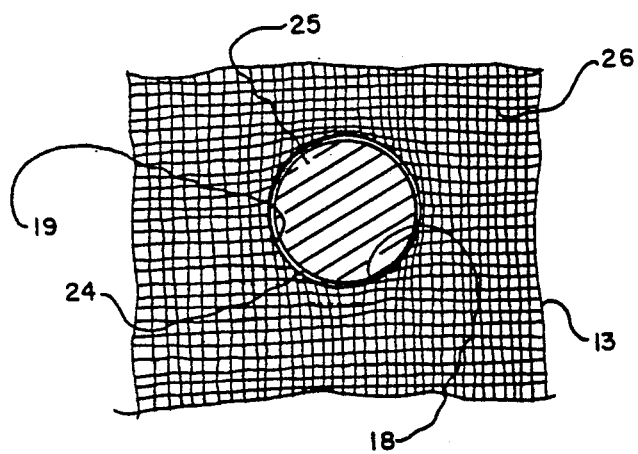
Figure 7:
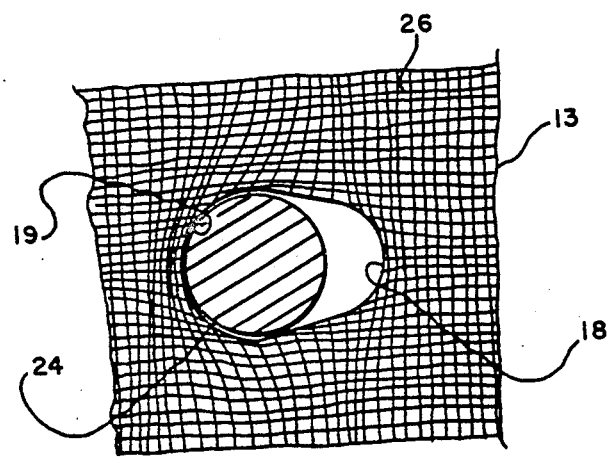

A state of the art track assembly is illustrated in FIG. 2. The cleat assembly is secured to belt 13 by bolt assemblies 16 installed in aligned holes 17, 18 and 19 in the grouser plate 15, belt 13 and a metallic backing plate 20 respectively. The belt contacting surfaces 21 and 22 of grouser 15 and plate 20 respectively are typically flat and smooth. Belt 13 is squeezed between grouser plate 15 and backing plate 20 by the bolt assembly 16. Either initially or with passage of time, the friction developed upon surfaces 21 and 22 may be insufficient to resist the shear load between belt 13 and the cleat assembly. The shear must then be resisted by bearing of bolt shanks 24 against sides 23 of the belt mounting holes 18. FIG. 5 illustrates a fragment of belt 13 after an extended period of use. Note the reduced thickness of the belt 13 from the squeeze of the grousers 15 and backing plates 20. FIG. 6 shows the plies 26 severed to provide the holes 18, and FIG. 7 the distorted holes 18 and plies 26. The holes 18 are deformed by the shearing forces until the uncut elastic cross threads near the holes can pick up the bearing forces from the holes and transform them into tension forces in the belt. The concentrated bearing forces elongate the unsupported holes 18, permanently deforming the belt 13 at the holes and loosening the cleat assemblies. Maneuvering the vehicle forwardly and backwardly alternates the direction of the forces on the holes 18, deforming them both forwardly and rearwardly. However, the cleat assembly 10 of the present invention does not rely upon transfer of the forces through the bolts 25 to the belt 13 at the holes 18. Rather, it provides for transfer of the shearing forces into the belt remotely from the mounting holes.

Figure 3:
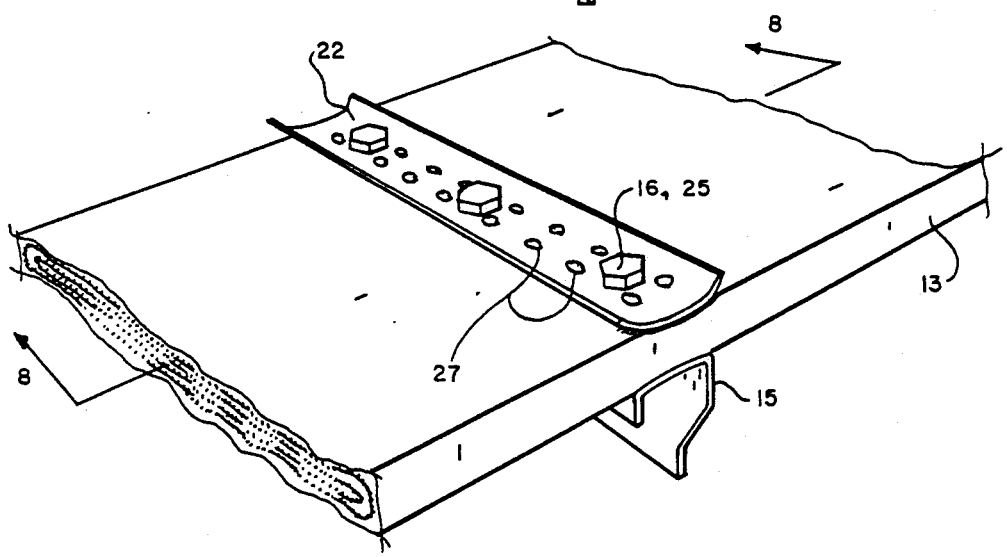
Figure 8:
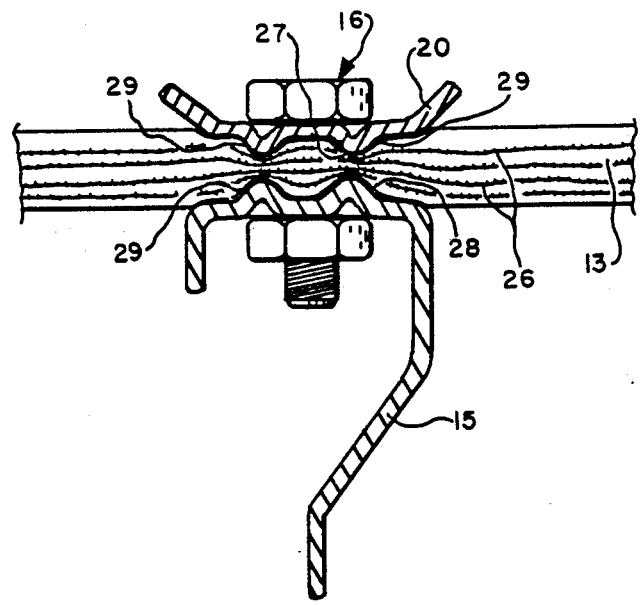
Figure 9:
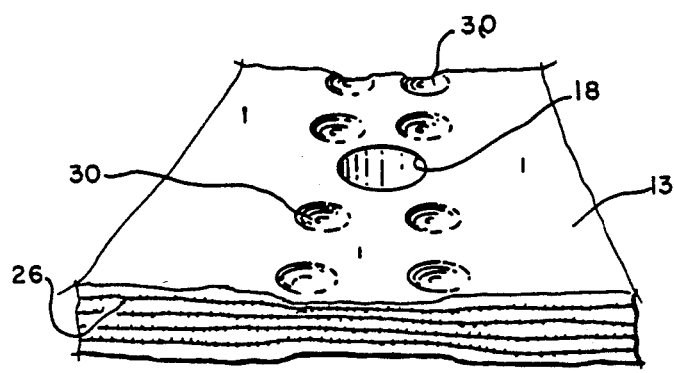

A preferred embodiment of the inventive cleat assembly 10 is shown in perspective in FIG. 3, and in section in more detail in FIG. 8. Cleat assembly 10 comprises a cleat backing plate 20 having a large number of projections 27 on its belt side face, created by forcibly dimpling its opposite face. Grouser plate 15 has similar beltward projections 28. Projections 27 and 28 are preferably equally spaced along plate 20 and grouser 15, advantageously in two rows. (FIG. 3) When bolt assemblies 16 are tightened, dimple projections 27 and 28 are pressed to seat firmly into the opposite surfaces of belt 13. Their projecting surfaces 29 provide bearing area to resist the shearing loads. The surfaces 29 in total provide a very large bearing area, distributing the loads to reduce local stresses in the belt so that it is not deformed excessively. Since the fabric layers 26 are not severed in the dimple locations, the shearing forces are picked up and tensioned by the fabric plies 26 at each projection with minimal local belt distortion. The local squeeze of the belt at each dimple enhances the bond between the rubber and the fabric, assuring transfer of the shearing load into the belt more reliably. The holes 18 are distorted only minimally, because the seated projections 27 and 28 move very little upon the belt, so that the holes assume almost none of the laod. The grip of plates 15 and 22 upon the belt tends to decrease as the plastic material sets under the sustained clamping forces. However, the belt material sets around the dimple projections 27 and 28, maintaining intimate contact. Periodic tightening of the bolt assembly 16 is therefore much less critical. FIG. 9 illustrates a fragment of the belt 13 after extended service, with the cleat assembly 10 removed. The belt 13 is thinned somewhat where it has been clamped between the backing plate 22 and the grouser 15. Craters 30 conform to the dimple projections 27 and 28. Note that the belt mounting hole 18 is undistorted.

Figure 10:
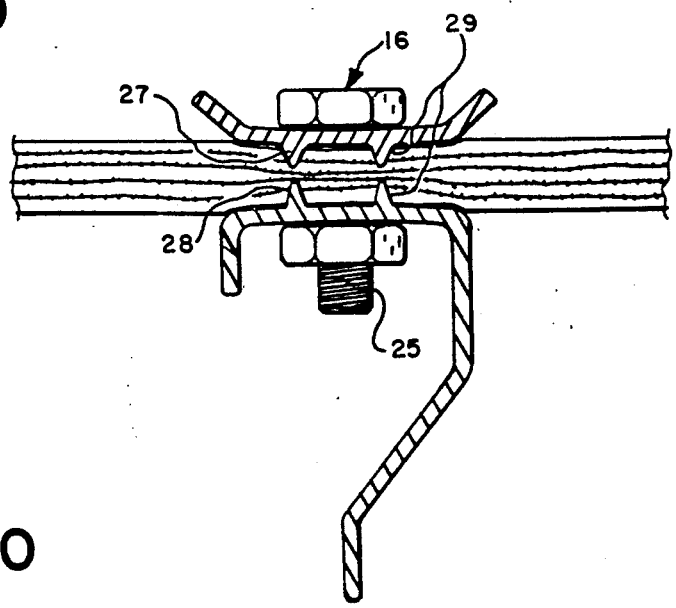

FIG. 10 shows another preferred embodiment of cleat assembly 10, wherein the grouser 15 and backing plate 20 have spike-like projections 27 and 28, instead of the previously described dimple projections. With this embodiment, the plastic material of belt 13 is damaged somewhat, being pierced by the spikes 27 and 28. Preferably, the spikes extend into belt 13 sufficiently to directly engage the fabric plies 26. The shearing forces may then be immediately resisted by tension in the fabric 26. As with the dimple projections, the spikes also provide projecting bearing area for shear force resistance.

Figure 11:
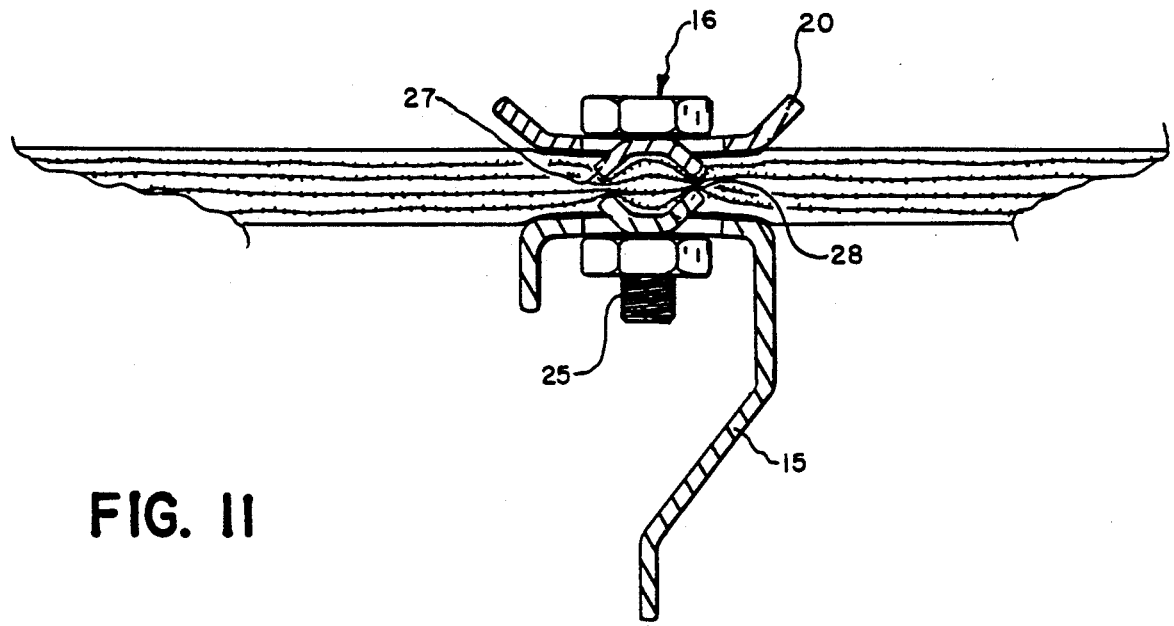

Still another preferred embodiment of cleat assembly 10 is shown in FIG. 11, employing punch-formed tab projections 27 and 28. The tabs are, as with the dimples, pressed into the material of belt 13. The projecting tabs perform in substantially the same manner as do the dimple projections. Local cutting of the material of belt 13 by the tab edges may occur, but may be acceptable providing the fabric 26 is not severed. Care in manufacturing is advisable to avoid sharp cutting edges and corners.

Other possible embodiments of cleat 10, not illustrated, include the use of continuous corrugations, machined knurls, or other types of projections for the grouser 15 and backing plate 20. However, the projections, to be sufficiently effective must be substantial. Merely roughening the surfaces 21 and 22 would not provide significant benefits.

The projections 28 may be located in other patterns than those illustrated. Especially, the grouser and backing plate projection patterns need not be limited to the matching patterns indicated in certain of the illustrations.

Figure 12:
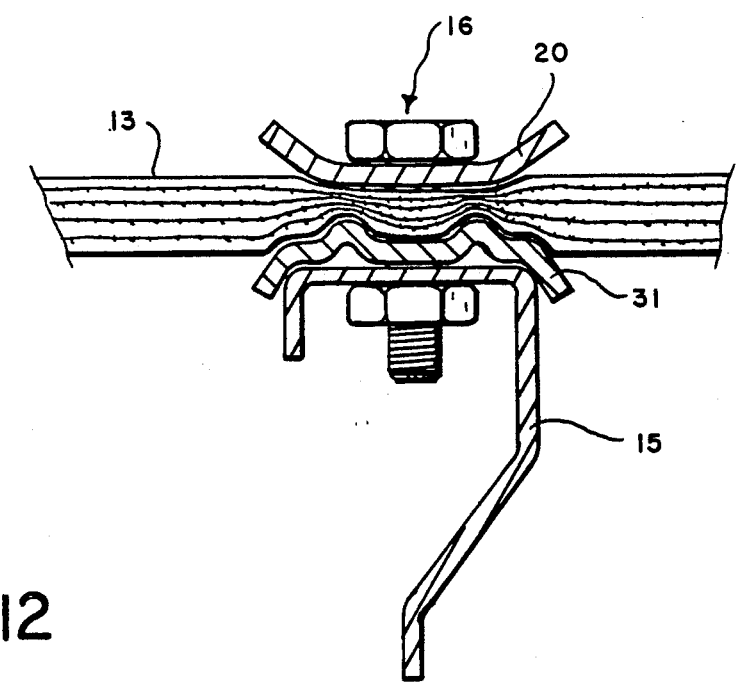

Clearly, considerable benefit would nevertheless derive if only one or the other of the grouser or backing plates were provided with the surface projections. Also, when it is advantageous to use existing grouser plates which do not have the projections, an intermediate gripper plate 31 having the projections 28 may be employed between the grouser plate and the belt. (FIG. 12) The belt shear load is then transferred through projections 28 on gripper plate 31 into bolt 25 and thence to ground-engaging grouser 15.

The invention may be embodied in other specific forms without departing from the spirit or essential characteristics thereof. The present embodiments are therefore to be considered as illustrative and not restrictive, the scope of the invention being indicated by the appended claims rather than by the foregoing description, and all changes that come within the meaning and range of equivalency of the claims are therefore intended to be embraced therein.

What is claimed and desired to be secured by United States Letters Patent is:

1. A cleat assembly for track assembly of a tracked vehicle, the track assembly having an endless flexible belt with sets of mounting holes therethrough longitudinally spaced therealong, each for mounting said cleat assembly transversely to the belt, said cleat assembly comprising:

an elongate, ground contacting grouser plate having a generally planar belt contacting portion, said portion having a set of spaced apart mounting holes therethrough aligned with one of the sets of mounting holes of the belt;

an elongate belt gripper plate having a set of mounting holes therethrough aligned with the mounting holes of the grouser plate, the gripper plate having a grouser contacting side and a belt contacting side, the latter including a multiplicity of projections;

an elongate backing plate having a set of mounting holes aligned with the mounting holes of the grouser plate; and a fastener operable through each of the matching holes to secure the grouser plate, the belt gripper plate, and the backing plate together, with the belt clamped between the backing plated and the griper plate with the projections pressed into the belt.

2. The cleat assembly of claim 1, wherein:
   the backing plate carries a multiplicity of spaced apart projections on its belt contacting side, which are also pressed into the belt.

3. The cleat assembly of claim 1, wherein:
   the belt engaging projections are rounded knobs.

4. The cleat assembly of claim 1, wherein:
   the belt engaging projections are spike shaped.

5. The cleat assembly of claim 1, wherein:
   the belt engaging projections are tabs formed by punch shearing partially therearound, said tabs remaining attached and being bent in the direction of the belt.

6. The cleat assembly of claim 2, wherein:
   the belt engaging projections are rounded knobs.

7. The cleat assembly of claim 2, wherein:
   the belt engaging projections are spike shaped.

8. The cleat assembly of claim 2, wherein:
   the belt engaging projections are tabs formed by punch shearing partially therearound, said tabs remaining attached and being bent in the direction of the belt.

* * * * *